United States Patent [19]
Guignard et al.

[11] Patent Number: 5,432,628
[45] Date of Patent: Jul. 11, 1995

[54] OPTICAL COMMUNICATIONS NETWORK

[75] Inventors: Philippe Guignard, Pleumeur Bodou; André Hamel, Lannion, both of France

[73] Assignee: France Telecom, France

[21] Appl. No.: 273,276

[22] Filed: Jul. 11, 1994

Related U.S. Application Data

[63] Continuation of Ser. No. 835,753, Feb. 13, 1992, abandoned.

[30] Foreign Application Priority Data

Feb. 20, 1991 [FR] France ............................. 91 02035

[51] Int. Cl.⁶ .............................................. H04B 10/20
[52] U.S. Cl. ..................... 359/118; 359/140; 359/119
[58] Field of Search ............... 359/114, 115, 117, 118, 359/119, 120, 121, 140, 152, 125; 385/2

[56] References Cited

U.S. PATENT DOCUMENTS

| | | | |
|---|---|---|---|
| 4,677,618 | 6/1987 | Haas et al. | 371/1 |
| 4,860,279 | 8/1989 | Falk et al. | 359/115 |
| 4,866,698 | 9/1989 | Huggins et al. | 359/115 |
| 4,882,775 | 11/1989 | Coleman | 359/115 |
| 4,956,834 | 9/1990 | Coleman | 359/133 |
| 5,125,049 | 6/1992 | Hamel et al. | 385/2 |

FOREIGN PATENT DOCUMENTS

| | | |
|---|---|---|
| 0213607 | 11/1987 | European Pat. Off. |
| 2608869 | 6/1988 | France |
| 2656752 | 7/1991 | France |

OTHER PUBLICATIONS

Coherence Multiplexing of Fiber-Optic Interferometric Sensors 8217 Journal of Lighwave Technology LT-3 (1985) Oct., No. 5, New York, USA By: Brooks et al pp. 1062-1071.

*Primary Examiner*—Leo H. Boudreau
*Assistant Examiner*—Rafael Bacaros
*Attorney, Agent, or Firm*—Hayes, Soloway, Hennessey, Grossman & Hage

[57] ABSTRACT

According to the present invention, an optical communications network is provided, which network comprises control means for controlling the network and a plurality of stations each having an information emitter and receiver. The stations are interconnected by optical signal transmission supports and the control means. According to the present invention, main delays of the stations are controllably modifiable, as desired, by the control means. Particular utility is found in the area of private communications networks, although other utilities are contemplated.

8 Claims, 2 Drawing Sheets

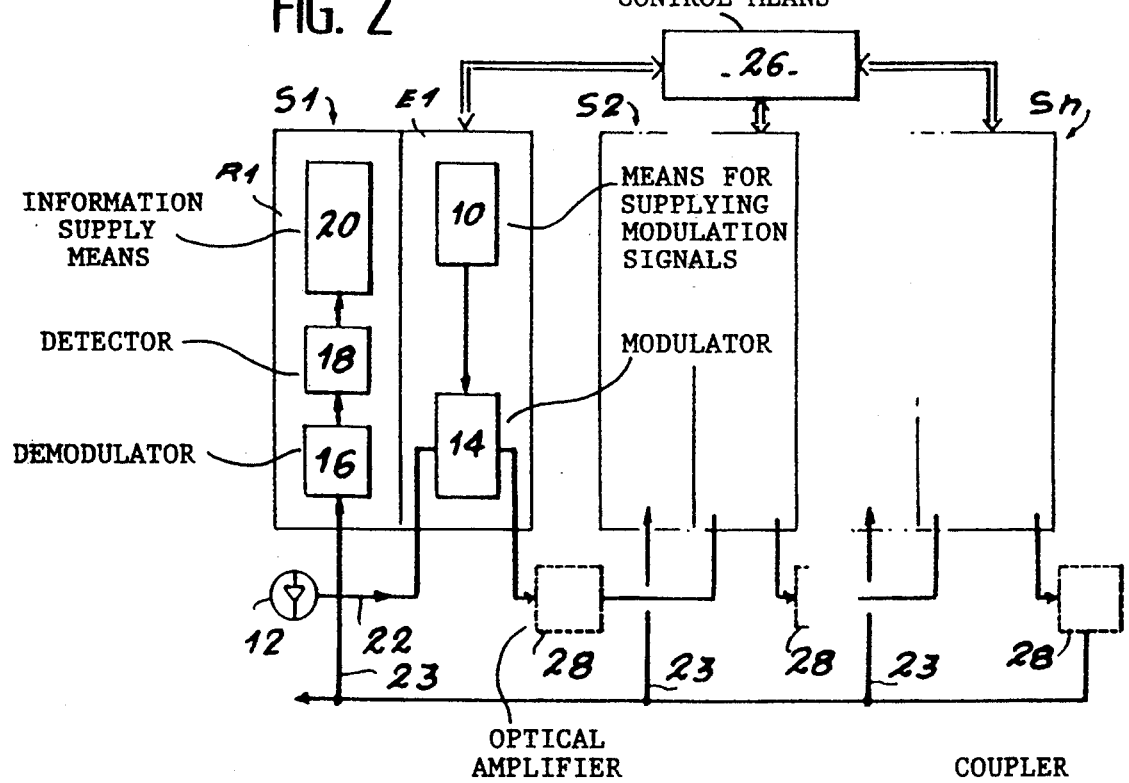
FIG. 2
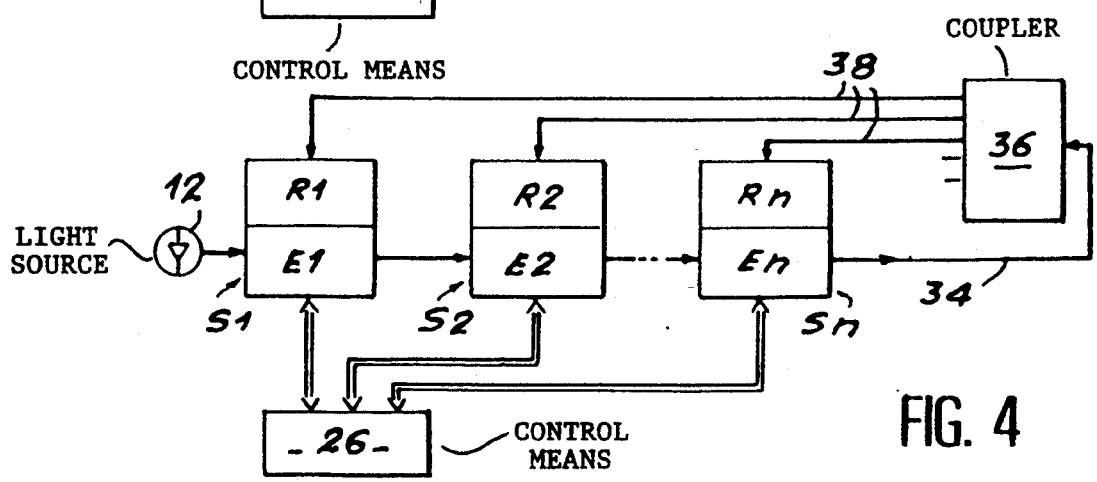
FIG. 3
FIG. 4

OPTICAL COMMUNICATIONS NETWORK

This is a continuation of application Ser. No. 07/835,753 filed on Feb. 13, 1992 now abandoned.

FIELD OF THE INVENTION

The present invention relates to an optical communications network, particularly of the private network type.

BACKGROUND OF THE INVENTION

1. Brief Description of the Related Art

Private communications networks permit the circulation of information within the same building or between different buildings. These buildings can e.g. be the various branches of a bank or the different rooms in a factory.

The digitally encoded information travels between stations distributed in the buildings and in each case comprise an emitter and a receiver. The information transmission supports are optical fibres in which each transmission channel corresponds to a particular wavelength. Each optical fibre permits the multiplex propagation of several light beams of different wavelengths.

Such optical communications networks are known and in exemplified manner reference is made to the network designated under the name Lambdanet developed by ATT-Bellcore or the Multicolore network developed by the Centre National d'Etude des Télécommunications (CNET).

The present invention relates to another private network type which, instead of using optical multiplexing, uses coherence modulation, or in other words the introduction of an optical delay modulated by a time exceeding the coherence time of the light beam, which supports the information.

Coherence modulation is known per se and is described in French Patent 2 608 869. An information is encoded by delaying part of the light beam by a main delay greater than the light beam coherence time and to which is added a variable modulation delay representing the information bits to be encoded. The variable delay is obviously very small compared with the fixed delay and consequently below the coherence time.

In order to decode the information, interference is brought about between the parts of the light beam by delaying the part in advance by the same main delay. This gives an intensity modulation corresponding to the variations of the variable delay, i.e. to the encoded information bits.

An advantage of a private network using coherence modulation is that it is possible to use several carriers (each carrier corresponding to a given main delay) on the same support, whilst ensuring a total separation of the different channels on reception.

SUMMARY OF THE INVENTION

More specifically, the invention relates to an optical communications network comprising several stations, each having an information emitter and an information receiver, the stations being interconnected by optical signal tranmission supports and network control means.

At the emitter, each station comprises information encoding means by modulating an optical delay, a modulated optical delay having a fixed main delay and a variable modulation delay which is small compared with the fixed main delay, and at the receiver information decoding means by the demodulation of a fixed main delay and at least one of the fixed main delays is adjustable or tunable, i.e. modifiable at random.

The invention is described in greater detail hereinafter relative to non-limitative embodiments and with reference to the attached drawings, wherein show:

BRIEF DESCRIPTION OF THE DRAWINGS

FIG. 2 diagrammatically a second embodiment of a network according to the invention.

FIG. 3 diagrammatically a third embodiment of a network according to the invention.

FIG. 4 diagrammatically a fourth embodiment of a network according to the invention.

DETAILED DESCRIPTION OF PREFERRED EMBODIMENTS

Figure 1:
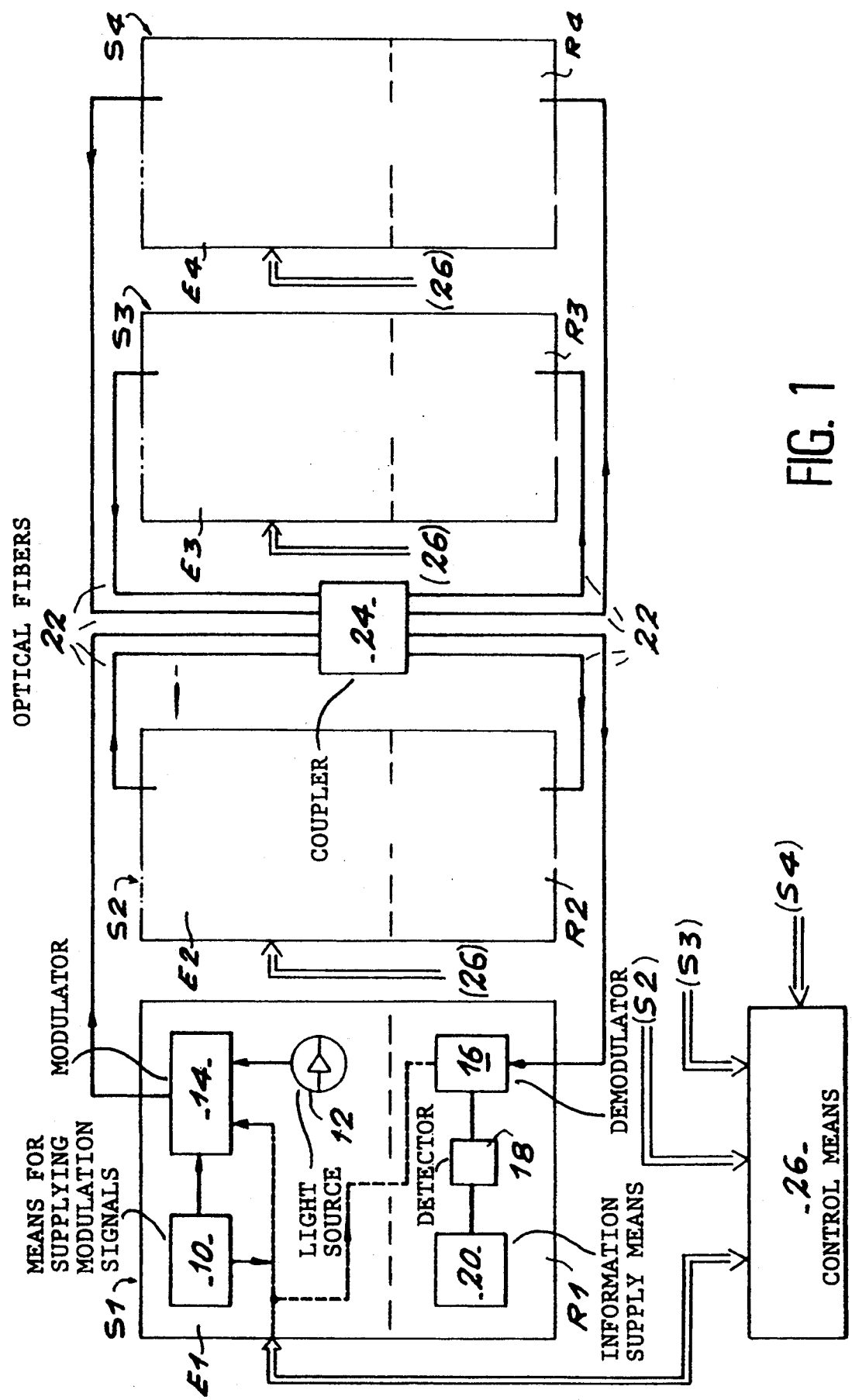
FIG. 1 diagrammatically a first embodiment of a network according to the invention.

In general terms, an optical communications network comprises several stations, each having an information emitter and an information receiver. Within the scope of the present invention, the informations travel in the form of light signals encoded by the modulation of an optical delay exceeding the coherence time of the sources, which produce the light beams.

With reference to FIG. 1, a description will now be given of a communications network according to the invention. In a non-limitative manner and with a view to simplifying the description, the network shown in FIG. 1 only has four stations S1,S2,S3,S4, each of which has an emitter E1,E2,E3,E4 and a receiver R1,R2,R3,R4.

Only the station S1 is shown in detail, whilst the others have an identical structure. An emitter has information encoding means consisting of a means 10 serving as an interface between the user and the remainder of the apparatus, a light source 12 and a modulator 14. The means 10 supplies modulation signals corresponding to the informations to be transmitted to the network, which can e.g. be a computer terminal.

The light source 12 supplies a light signal carrying the information, and can be a light-emitting or superluminescent laser diode. The light signal is supplied at the input of the modulator 14 controlled by the modulation signals from the means 10. This modulator 14 permits the introduction of an optical delay formed by a fixed main delay exceeding the coherence time of the source 12 and a variable delay corresponding to the modulation. The variable delay is small compared with the fixed delay, so that no light intensity modulation appears at the output of the modulator 14. The latter can be an electro, acousto, magneto or elasto-optical modulator. The modulation can also be induced by a mechanical or interferometric effect.

Each receiver incorporates information decoding means by the demodulation of an optical delay. As can be seen in the case of station S1, a receiver incorporates a demodulator 16 connected to an optical detector 18 supplying on an output electrical signals corresponding to the informations. The demodulator makes it possible to make up a main delay introduced by a modulator. This creates interferences, the light intensity being modulated in accordance with the modulation introduced on emission. Information supply means 20 are connected to the output of the detector 18 and incorporate means for shaping the electrical signals supplied by the detector 18. The information supply means 20 can e.g. be in the form of a display screen.

Like the modulator, the demodulator 16 can be of different types. More detailed modulator and demodulator construction information is provided in French Patent 2 608 869.

Each emitter is connected to the receivers of the other stations by optical signal transmission supports, namely monomodal or multimodal optical fibres 22 interconnected by a "passive star-connected" coupler 24. Such couplers are e.g. marketed by GOULD under the reference 1270/1600 4×4 or 8×8.

In the embodiment shown in FIG. 1, the modulation of the delays takes place in parallel. On the basis of this basic architecture, various configurations are possible as a function of whether a particular main delay is allocated to each station or a particular main delay is allocated to each accessible service type on the network.

If a particular main delay is allocated to each station, addressing at a station takes place by the choice of the delay allocated to it. For this purpose a distinction can be made between three cases:

In case 1, a non-adjustable, fixed main delay is allocated to each emitter, whilst the delays allocated to the receivers are adjustable. It is then possible to simultaneously transmit a message to all the stations, without any despatch confidentiality.

In case 2 the delay allocated to each emitter is adjustable, whereas the delays allocated to the receivers are not. In this case, the emitter used is adjusted or tuned to the destination station and the transmitted informations are only received by the latter, so that confidentiality is ensured. However, the transmission of the same message to all the stations makes it necessary for the emitter used to reemit the informations, by successively tuning to all said stations.

In case 3 the delays allocated to the emitters and receivers are adjustable.

This architecture leads to a greater control flexibility and makes it possible to have a network with a number of stations exceeding the number of installed delays, whilst taking account of the occupation rate of the network by users.

Whichever architecture is adopted, control or management means 26 connected to each station in each case make it possible to allocate the delays to the emitters and/or receivers. Such control means 26 are essentially constituted by an appropriately programmed processor.

The control means 26 also control the communication mode for the informations between the stations. Thus, there is the "circuit" mode, in which a continuous link is established at the start of the communication, is maintained throughout the duration of said communication between the emitter and receiver in question, whereas in the "packet" mode the informations from each emitter are arranged in stacked form and subdivided into packets having a given duration and successively a packet from each emitter is emitted on the network.

If a particular main delay is allocated to each accessible service type on the network, several mutual networks exist on the same physical support. A single main delay relating to a service is allocated to the emitters and receivers of the stations for access to the said service. The stations communicate with one another, e.g. using a conventional protocol of the "token" or "collision detection" type controlled by the control means 26.

FIG. 2 diagrammatically shows another embodiment of a network according to the invention. As can be seen relative to the station S1 shown in greater detail, the stations have a structure virtually identical to that described hereinbefore. It is for this reason that the identical means carry the same references as in FIG. 1.

The network of FIG. 2 is of the "series" type, a light source 12 being in common to all the stations S1,S2, . . . , Sn, n representing the number of stations. This light source 12 supplies a light beam carried by an optical fibre 22, which is connected to each emitter and more particularly at the input and output of each modulator. Optical fibre output sections 23 are connected to the fibre 22 and to the receivers at the input of the demodulator 16.

As in all optical networks, an amplification may be necessary following the passage of the light beam through the modulator. In the present case, possible optical amplifiers 28 connected at the output of the emitters are shown.

In this embodiment, a particular main delay can be allocated to each emitter. An advantage of this architecture is that it only has a single light source, so that it is easier to maintain.

FIG. 3 diagrammatically shows another embodiment of a network according to the invention and which has a mixed architecture, i.e. the stations S1,S2,S3 (three are shown in the embodiment for simplification purposes and is in no way limitative) having emitters E1,E2,E3, connected by their optical fibres 22 to the inputs of a coupler 30 of the 1×8 type, e.g. marketed by GOULD under reference 1270/1600 WIC. Therefore emission is organized in the same way as in the embodiment of FIG. 1.

The coupler 30 supplies light signals from the optical fibres 22 to an output fibre 32 connected to output sections 33. Each of the output sections 33 is connected to one of the receivers R1,R2,R3. Therefore reception is organized in the same way as that of the embodiment of FIG. 2. The multiplexing in parallel of the delays on emission allows several stations to work with an identical main delay.

FIG. 4 diagrammatically shows another embodiment of a network according to the invention, which has a mixed architecture based on the embodiments of FIGS. 1 and 2.

As in the embodiment of FIG. 2, a light source 12 emits a light beam at the input of an optical fibre 34, which connects the emitters of the stations S1,S2, . . . Sn (n being the number of stations) in series. The optical fibre 34 is connected to the input of a coupler 36 of the 1×4 type. The coupler 36 has several outputs, each being connected to an input of a receiver by an optical fibre 38.

Thus, the emission is organized in the same way as in the embodiment of FIG. 2, whereas the reception is organized in the same way as that of FIG. 1.

In each of the embodiments, the control means 26 make it possible to obtain communication protocols between stations (e.g. based on the token or collision detection mode) and the information transfer mode (e.g. in the "circuit" or "packet" mode).

It would also be possible to have a network with N stations according to the invention, in which N1 stations have a receiver, whose main fixed delay is adjustable, N2 stations having a receiver, whose fixed main delay is adjustable and N3 stations having a fixed main delay which is adjustable for the emitter and the receiver, with N=N1+N2+N3 and in which one of the numbers N1,N2 and N3 can be zero.

We claim:

1. An optical communications network comprising:
    a. a plurality of stations (S1, S2, S3, S4) connected to each other by optical signal transmission supports, each of said stations having an information emitter and an information receiver, each said emitter having information encoding means for encoding information to be transmitted from at least one of said stations to at least one other of said stations, said encoding means encoding information by coherence modulation by modulating an optical delay having a main delay component fixed prior to transmission of information and a variable modulation delay component, each said receiver having an information decoding means for decoding information to be received by said at least one other of said stations from said at least one of said stations, said decoding means demodulating said main delay component; and b. a control means (26) connected to each said station by said supports for controlling each said emitter and receiver by adjusting and coordinating the main delay component of said coherence modulation prior to transmission of information between said stations to permit any station of said network to communicate with any other station of said network, and to permit said network to be selectively reconfigurable, as desired.

2. A network according to claim 1, wherein several encoding means (10,12,14) and several decoding means (16,18,20) have the same main delay.

3. A network according to claim 1, , wherein each emitter (E1,E2,E3,E4) has a light source (12).

4. A network according to claim 1, wherein a light source (12) is common to several emitters (E1, E2, E3, E4).

5. A network according to claim 1, and further comprising a coupler (24,30,36) connected at the input to the emitters and at the output to the receivers.

6. A network according to claim 1, wherein the main delay relative to each emitter (E1,E2,E3,E4) is controllably modifiable, as desired, by said control means.

7. A network according to claim 1, wherein the main delay relative to each receiver (R1,R2,R3,R4) is controllably modifiable, as desired, by said control means.

8. A network according to claim 1, wherein the main delay relative to each emitter and to each receiver is controllably modifiable, as desired by said control means.

* * * * *